United States Patent
Delbridge et al.

(10) Patent No.: US 9,332,880 B2
(45) Date of Patent: *May 10, 2016

(54) SPICE GRINDER

(71) Applicants: David Stephen Delbridge, Cape Town (ZA); Patrick John Delbridge, Cape Town (ZA)

(72) Inventors: David Stephen Delbridge, Cape Town (ZA); Patrick John Delbridge, Cape Town (ZA)

( * ) Notice: Subject to any disclaimer, the term of this patent is extended or adjusted under 35 U.S.C. 154(b) by 0 days.

This patent is subject to a terminal disclaimer.

(21) Appl. No.: 14/328,530

(22) Filed: Jul. 10, 2014

(65) Prior Publication Data

US 2014/0319255 A1 Oct. 30, 2014

Related U.S. Application Data

(63) Continuation of application No. 13/511,694, filed on May 24, 2012, now Pat. No. 8,783,595.

(30) Foreign Application Priority Data

Dec. 4, 2009 (ZA) .................................. 2009/08610

(51) Int. Cl.
  A47J 42/38 (2006.01)
  A47J 42/14 (2006.01)
  A47J 42/20 (2006.01)

(52) U.S. Cl.
  CPC ......... *A47J 42/38* (2013.01); *A47J 42/14* (2013.01); *A47J 42/20* (2013.01)

(58) Field of Classification Search
  CPC ........... A47J 42/14; A47J 42/20; A47J 42/00; A47J 42/04; A47J 42/08; A47J 42/38
  USPC ....................................... 241/169.1
  See application file for complete search history.

(56) References Cited

U.S. PATENT DOCUMENTS 8,783,595 B2 * 7/2014 Delbridge et al. ......... 241/169.1

* cited by examiner

*Primary Examiner* — Mark Rosenbaum
(74) *Attorney, Agent, or Firm* — Stephen J. Weyer; Stites & Harbison PLLC

(57) ABSTRACT

A spice grinder comprising a bottle (60) and a grinder unit (10) which is screwed onto the bottle. The grinder unit comprises a fixed component (12) and a rotatable component (14). The components have teeth (28, 44) which face one another across a grinding gap (52). The component (12) has one or more ramps (54) on the inside thereof and the bottle (60) has one or more external ramps (66). Each ramp (54) comprises a camming surface (56) and a locking surface (58) which intersect. The ramp (66) also comprises a camming surface (68) and a locking surface (70). When the grinder unit (10) is screwed onto the bottle the ramps (54, 66) ride over one another until the surfaces (56, 70) clear one another and the surfaces (58, 70) snap into face-to-face contact to prevent the grinder unit being rotated in the direction which unscrews it from the bottle.

10 Claims, 2 Drawing Sheets

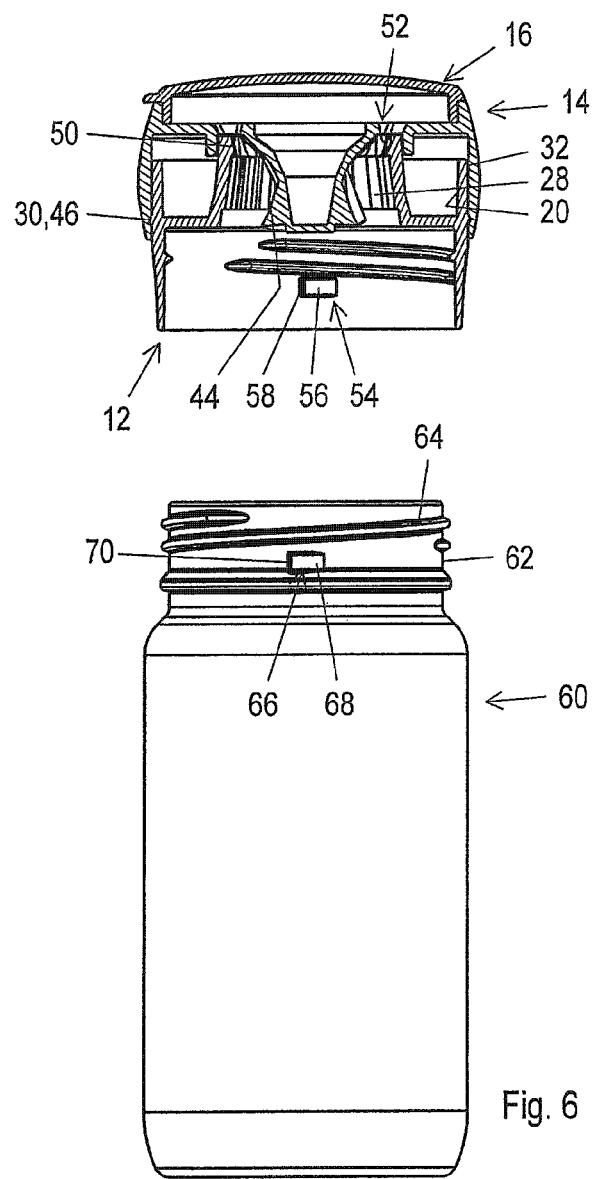
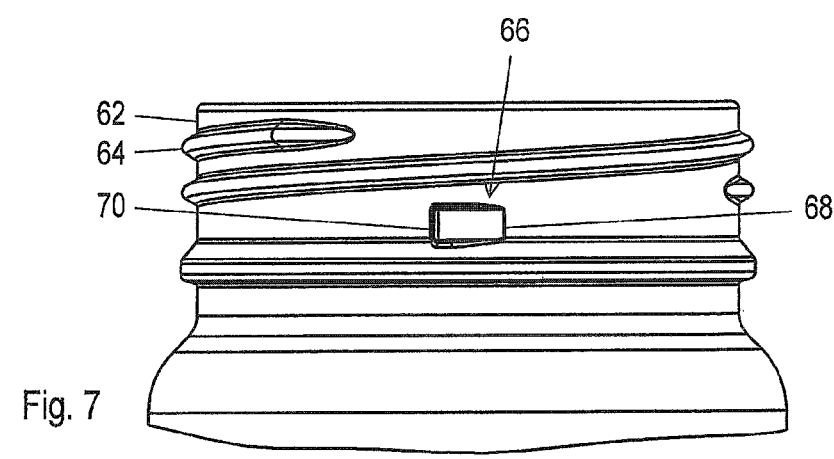
Fig. 6
Fig. 7

SPICE GRINDER

CROSS REFERENCE TO RELATED APPLICATIONS

This application is a continuation of application Ser. No. 13/511,694, filed May 24, 2012, now U.S. Pat. No. 8,783,595 (which is hereby incorporated by reference).

FIELD OF THE INVENTION

This invention relates to spice grinders.

BACKGROUND TO THE INVENTION

Many spice grinders in common usage are constructed so as to be non-refillable. Such spice grinders comprise a bottle of glass or synthetic plastics, and a two component grinder unit fitted to the bottle.

The first component of the grinder unit is secured to the bottle in such manner that it is non-rotatable and is not removable from the bottle unless an excessive force is applied to prise it off. Damage to the fixed component usually results if it is forced off the bottle.

The second component is rotatable on the first component but cannot be detached from the first component except by exerting excessive force. Again damage normally results.

The components carry co-operating grinding teeth which, on inversion of the bottle and rotation of the second component with respect to the first component, grind the spice which has fallen between the teeth.

One known form of grinder unit has a snap-on cap which is pressed onto the bottle so that a bead on the bottle snaps into an internal groove of the fixed component thereby to prevent removal of the fixed component. Two or more protrusions are provided between the mouth of the bottle and the bead. The fixed component has a circumferential array of protrusions on the inside thereof. The protrusions intermesh as the fixed component is pressed onto the bottle thereby to prevent the fixed component rotating.

Grinder units in which the fixed component screws tightly onto the bottle are not usually of the non-refillable type as the fixed component can be screwed-off the bottle. However, it is also known to provide a bead on the fixed component and groove in the bottle, the bead snapping into the groove as the non-rotatable component reaches its fully screwed on position.

The present invention provides an improved spice grinder of the non-refillable type in which the fixed component is screwed onto the bottle.

BRIEF DESCRIPTION OF THE INVENTION

According to the present invention there is provided a spice grinder comprising a spice grinder comprising a grinder unit and a bottle having an external screw thread adjacent the mouth of the bottle, the grinder unit comprising a first grinder component having an internal screw thread compatible with that of the bottle and a second grinder component which can rotate with respect to the first component, the components having co-operating grinding teeth, there being a first protrusion on the inside surface of the first component and a second protrusion on the external surface of the bottle which come into interlocking relationship as the fixed component is screwed onto the bottle whereby the protrusions prevent rotation of the fixed component in the direction which unscrews it from the bottle.

Preferably there is more than one first protrusion and more than one second protrusion. Where two or more protrusion are provided they are spaced apart equidistantly around the first component and around the bottle.

The thread can be a single start thread but is preferably a multi-start thread with two or three starts.

BRIEF DESCRIPTION OF THE DRAWINGS

For a better understanding of the present invention, and to show how the same may be carried into effect, reference will now be made, by way of example, to the accompanying drawings in which:

FIG. 6 illustrates a spice grinder, the grinder unit being in section and a bottle of the grinder being in elevation; and FIG. 7 illustrates, to a larger scale, the neck of the bottle.

DETAILED DESCRIPTION OF THE DRAWINGS

Figure 1:
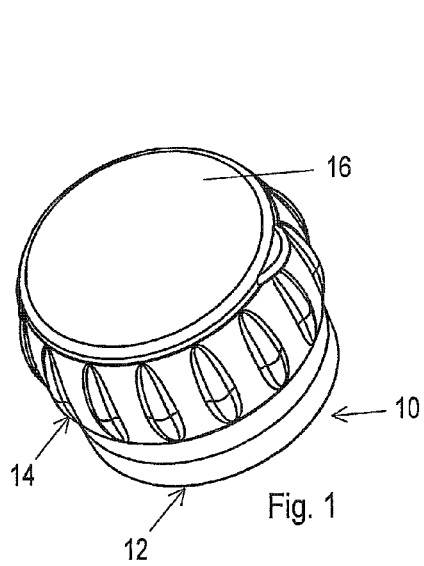
FIG. 1 is a pictorial view of an assembled grinder unit.
Figure 2:
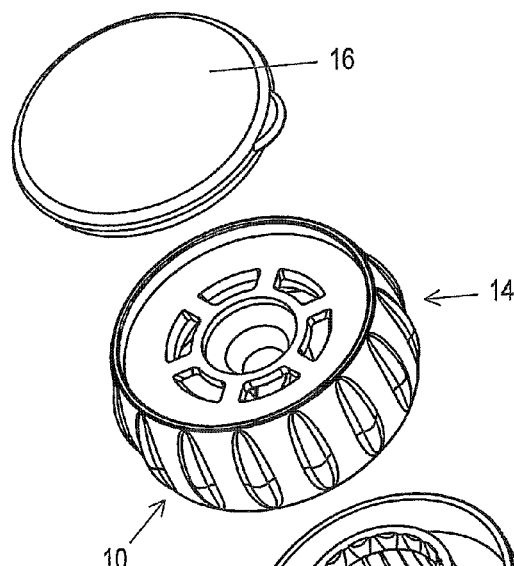
FIG. 2 is a pictorial view of the components of the grinder unit.

Referring to the drawings, the spice grinder unit 10 (FIGS. 1 and 2) comprises a static component 12 which screws onto the neck of a bottle (not shown in FIGS. 1 and 2), the bottle and grinder unit together forming a spice grinder. A rotatable component 14 of the grinder unit 10 snap fits onto the static component 12 of the grinder unit 10 and there is a closure cap 16 which fits onto the rotatable component 14.

The component 12 (FIGS. 2 and 3) includes a skirt 18 which has an internal screw thread 18.1 so that it can be screwed onto the bottle. Above the skirt 18 there is an outer sleeve 20 and an inner tapering sleeve 22. A circumferentially extending web 24 joins the sleeves 20 and 22 at their lower ends. The sleeve 22 has a conical bore 26 and teeth 28 protrude inwardly from the surface of the bore 26. Each tooth 28 is in the form of a rib which extends along the surface of the sleeve 22. Each rib is bounded by two intersecting surfaces of unequal width.

Figure 3:
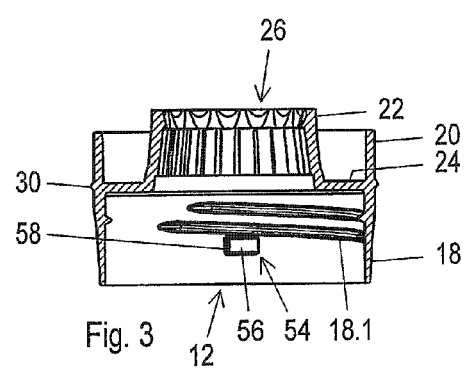
FIG. 3 is an axial section through the fixed component of the grinder unit.

The threading inside the skirt, as this is illustrated in FIGS. 3 and 6, is continuous. However, as will be explained later, the threading is interrupted in that it has gaps in it at diametrically opposed locations.

On the external surface of the component 12 there is a circumferentially extending rib 30.

Figure 4:
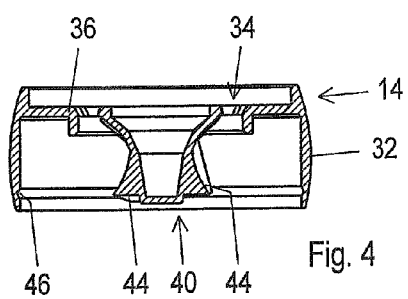
FIG. 4 is an axial section through the rotatable component of the grinder unit.
Figure 5:
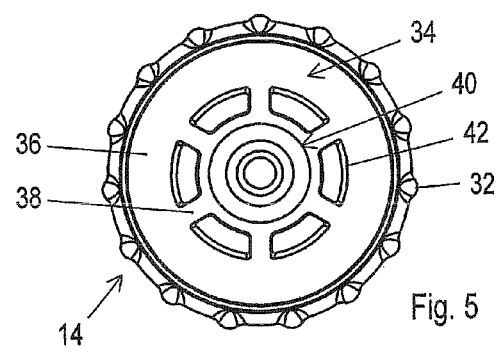
FIG. 5 is a top plan view of the rotatable component.

The rotatable component 14 (FIGS. 2, 4 and 5) comprises an outer skirt 32 and a spider 34. The spider 34 includes an outer ring 36, radial spokes 38 and a cone 40 forming the centre of the spider 34. The openings between the spokes 38 are designated 42.

The cone 40 is closed at its lower end and joined, at its upper end, to the ring 36 by the spokes 38 which extend outwardly from the cone 40. On the outside of the cone there are four equally spaced protruding teeth 44 (see FIG. 4).

An internal groove 46 (FIG. 4) is provided on the inner cylindrical face of the skirt 32. In a modified form there are two parallel, spaced grooves 46 in the skirt both of which can receive the rib 30. Displacing the component 14 with respect to the component 12 so that the rib 30 snaps into the other groove changes the size of the grinding gap.

As shown in FIG. 6, the sleeve 20 fits in the sleeve 32, the rib 30 snapping into the groove 46. This prevents the component 14 being separated from the component 12.

The angled teeth 44 break the pepper corns but do not grind them. They also push the corns towards the fine grinding zone, constituted by the smaller teeth 50 which are provided around the outer surface of the cone 40 at its wider end.

When the grinder unit is inverted from the position shown in FIG. 6, peppercorns drop into the gap between the cone 40 and the sleeve 22. As the component 14 is rotated on the component 12, the co-operating teeth 28 and 44 break the peppercorns between them. The teeth 50, which co-operate with the parts of the teeth 28 which are at the smaller diameter end of the bore 26, act as a fine grinding structure. The fragments drop out of the grinder through the annular gap 52 between the inner edge of the sleeve 22 and the widest part of the cone 40. This gap registers with the radially inner parts of the openings 42.

A protrusion in the form of a ramp 54 is provided on the inner face of the skirt 18 of the static component 12. The ramp 54 has a sloping camming surface 56 and a locking surface 58 which intersects the surface 56 and lies in a generally radial plane.

A second protrusion in the form of a ramp 54 is provided at a diametrically opposite position to the illustrated ramp. If desired more than two ramps can be provided, the ramps being spaced around the static component 12.

To enable the ramps to be moulded a collapsible core has to be used. The gaps in the thread of the static component permit the core to be pulled out without damaging the threading.

The bottle onto which the static component 12 of the grinder unit 10 is screwed to form the spice grinder is designated 60 (see also FIG. 7). The bottle 60 has a neck 62 which carries an external screw thread 64 compatible with that of the static component 12. The thread can be a single start thread but is preferably a multi-start thread with two or three starts.

The bottle's neck 62 has two similar protrusions in the form of ramps 66 with camming surfaces 68 and locking surfaces 70 which come into co-operating relationship with the ramps 54. The camming surfaces ride over one another and, as they pass, the locking surfaces snap into face-to-face contact. This prevents the static component being turned in the direction which would unscrew it from the bottle. The threads are configured to reach their tightened position as the ramps move past one another.

The invention claimed is:

1. A spice grinder comprising:
   a bottle having an external screw thread adjacent a mouth;
   a grinder unit comprising
      a first grinder component having an internal screw thread compatible with that of the bottle to fix the first grinder component to the bottle,
      a second grinder component which rotates with respect to the first component,
      co-operating grinding teeth on the first and second grinder components,
      a first protrusion on an inside surface of the first grinder component, and
      a second protrusion on an external surface of the bottle,
         which first and second protrusions come into interlocking relationship as the fixed first grinder component is screwed onto the bottle whereby the first and second protrusions prevent rotation of the fixed first grinder component in the direction which unscrews it from the bottle.

2. A spice grinder as claimed in claim 1, wherein there is more than one first protrusion and more than one second protrusion.

3. A spice grinder as claimed in claim 2, wherein the first and second protrusions are spaced apart equidistantly around the first grinder component and around the bottle.

4. A spice grinder as claimed in claim 1, wherein the threads are single start threads.

5. A spice grinder as claimed in claim 1, wherein the threads are multi-start threads with two or three starts.

6. A spice grinder comprising:
   a bottle having a mouth;
   a grinder unit comprising
      a first grinder component having
      a second grinder component which rotates with respect to the first component,
      the first and second grinder components having co-operating grinding teeth,
      a first protrusion on an inside surface of the first grinder component, and
      a second protrusion on an external surface of the bottle, and
   a fixing mechanism which fixes the first grinder component to the mouth of the bottle with the first and second protrusions in interlocking relationship whereby the first and second protrusions prevent rotation of the first grinder component relative to the bottle.

7. A spice grinder as claimed in claim 6, wherein there is more than one first protrusion and more than one second protrusion.

8. A spice grinder as claimed in claim 7, wherein the first and second protrusions are spaced apart equidistantly around the first grinder component and around the bottle.

9. A spice grinder as claimed in claim 6, wherein the fixing mechanism includes external threads on the bottle and internal threads on the first grinder component.

10. A spice grinder as claimed in claim 9, wherein the external and internal threads are multi-start threads with two or three starts.

\* \* \* \* \*